Figure 1:
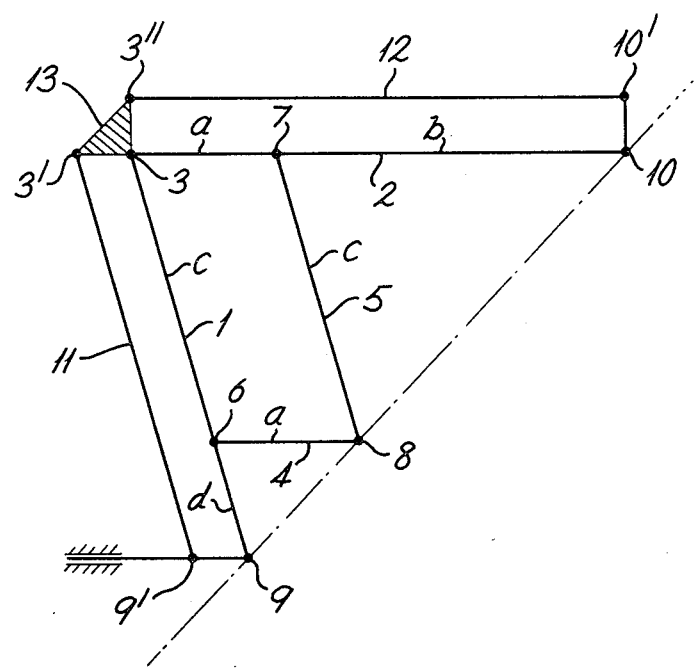

United States Patent [19]

Pham

[11] 4,437,635
[45] Mar. 20, 1984

[54] PANTOGRAPH LINKAGE SYSTEM

[75] Inventor: Duc T. Pham, Birmingham, England

[73] Assignee: National Research Development Corporation, London, England

[21] Appl. No.: 342,426

[22] Filed: Jan. 25, 1982

[30] Foreign Application Priority Data

Jan. 26, 1981 [GB] United Kingdom ............... 8102311

[51] Int. Cl.³ .................................................. F16L 3/00
[52] U.S. Cl. ....................................... 248/122; 74/103; 74/479; 248/281.1; 414/917
[58] Field of Search .................. 248/280.1, 281.1, 125, 248/647, 123.1, 124, 421, 122, 660, 652, 654; 414/1, 4, 917; 74/103, 105, 479

[56] References Cited

U.S. PATENT DOCUMENTS

| | | | |
|---|---|---|---|
| 2,782,836 | 2/1957 | Krakauer | 297/85 |
| 3,396,931 | 8/1968 | Eckstein | 248/280.1 |
| 3,703,968 | 11/1972 | Uhrich et al. | 414/917 X |
| 3,850,307 | 11/1974 | Motoda | 414/917 X |
| 4,266,747 | 5/1981 | Souder, Jr. et al. | 248/280.1 |

FOREIGN PATENT DOCUMENTS 583687 12/1946 United Kingdom .
690494 4/1953 United Kingdom .
1478886 7/1977 United Kingdom .

Primary Examiner—J. Franklin Foss
Assistant Examiner—David L. Talbott
Attorney, Agent, or Firm—Cushman, Darby & Cushman

[57] ABSTRACT

A pantograph linkage system for use in a manipulating tool comprises a pair of pantographs linked together in parallel. Each pantograph consists of a pair of arms held in a fixed relative orientation and the two arms comprise components of parallel linkages. A tool holder appropriately mounted on the free end of the arms can then be moved in all three dimensions without changing its spatial orientation. Simple straightline input movements are all that is required to effect movement of the tool holder.

4 Claims, 6 Drawing Figures

PANTOGRAPH LINKAGE SYSTEM

This invention relates to a pantograph linkage system for use in manipulators or like tools, especially those commonly termed robot arms.

Pantograph linkage systems are well known for mounting lamps as for example described in British Patent Specification No. 583,687. Comparable linkage systems have been proposed for microscope or dissection manipulators as described in British Patent Specification No. 690,494. It has furthermore been proposed in British Patent Specification No. 1,478,886 to employ pantograph linkages in cranes and the like to enable loads to be moved along controlled and predictable paths in two dimensions.

Such prior linkage systems, however, have either or both only been operative to effect straightline movements in two dimensions or have not been capable of maintaining the tool or the like moved thereby in a constant orientation during three dimensional movement.

It is an object of this invention to provide a linkage system capable of straightline motions in three dimensions and whereby a tool or the like mounted thereon may be maintained in a constant spatial orientation during movements in all three dimensions. It is to be understood however that the invention may also be of use in circumstances in which it is not necessary to maintain a tool in a constant orientation whilst moved in three dimensions in which case movement in only one or two selected directions may be arranged to be effected without altering a tool's orientation.

According to one aspect of the invention a manipulator comprises a pair of pantographs interconnected to serve as opposed links of a parallelogram linkage, the pantographs in turn having first and second arms each operative as a parallelogram linkage, means for maintaining interconnections of the parallelogram linkages in fixed relative relationships and means for imparting linear input movements in all three dimensions to the pantographs whereby three dimensional movement of a tool or the like suitably secured to the pantographs may be occasioned whilst maintaining its spatial orientation constant.

Figure 2:
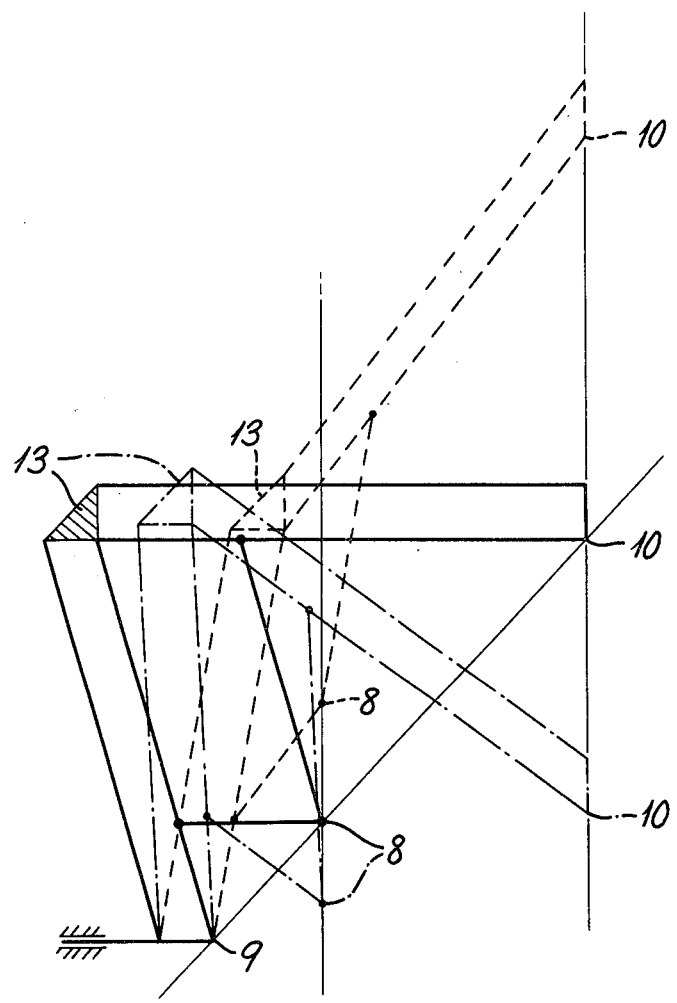
Figure 3:
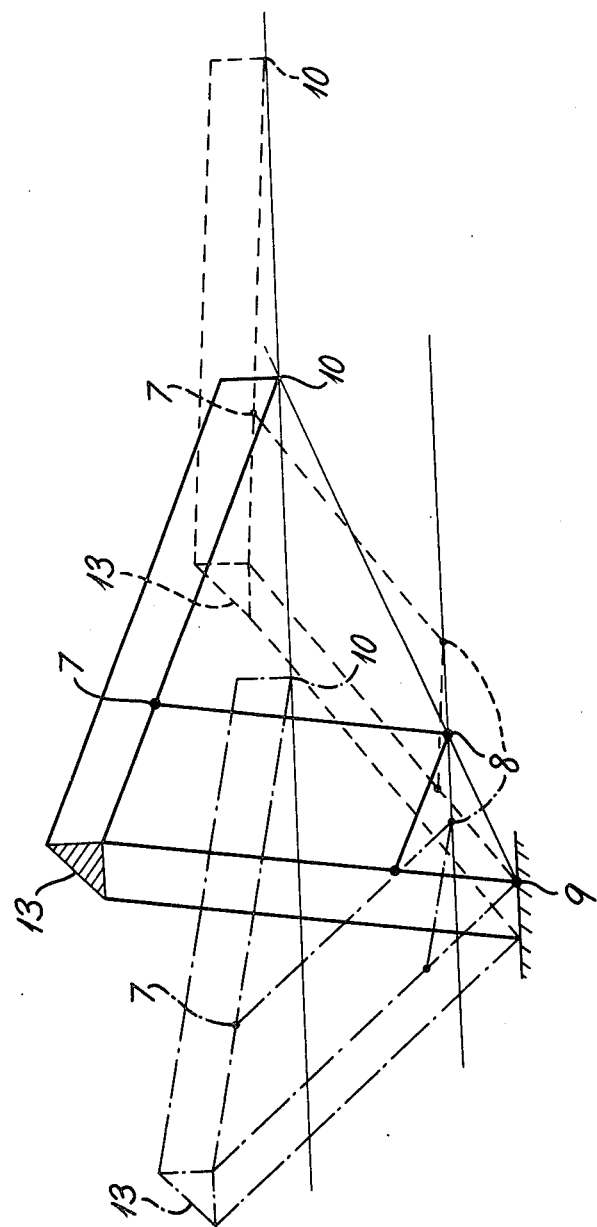
Figure 4A:
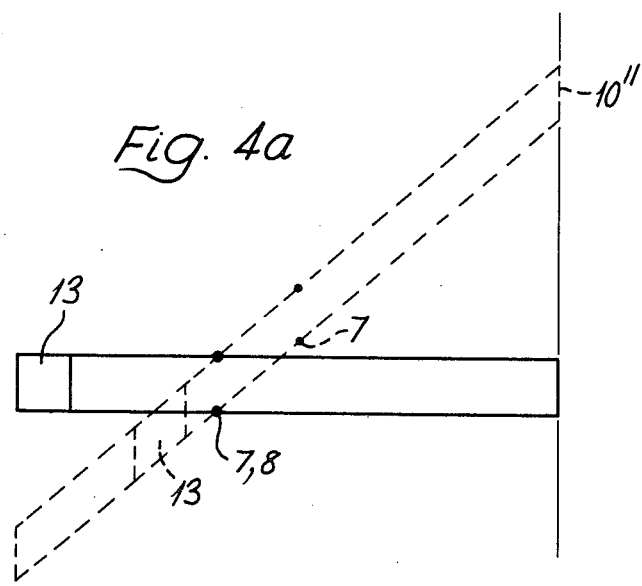
Figure 4B:
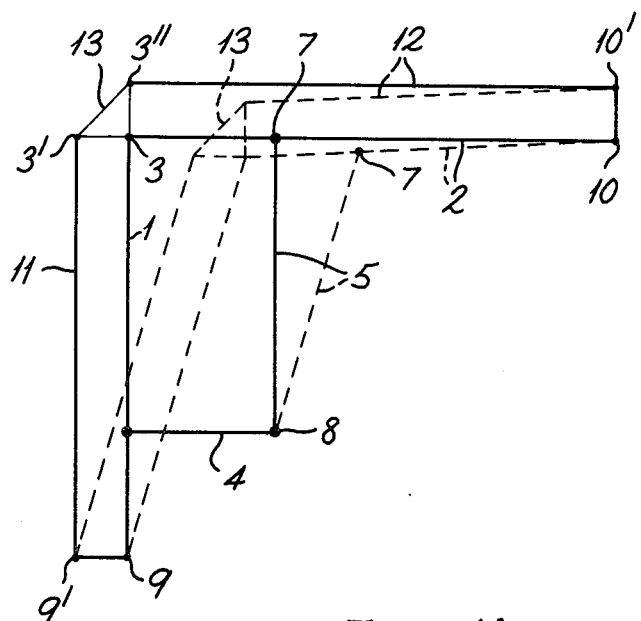
Figure 5:
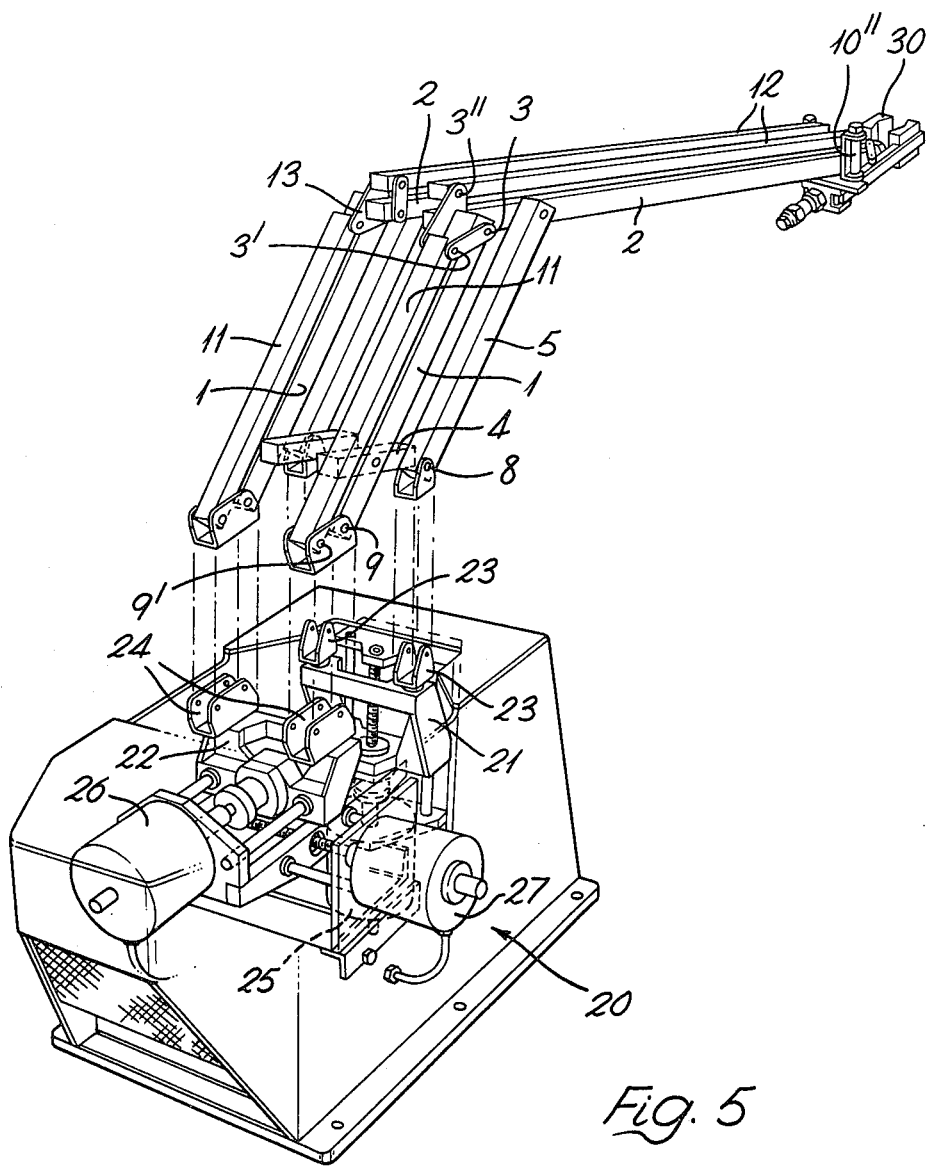

The invention is described below with reference to the accompanying drawings in which:

FIG. 1 is a diagrammatic elevational view of a pantograph linkage system in accordance with the invention, FIG. 2 is a view of the system of FIG. 1 showing how vertical (Z co-ordinate) movement thereof can occur, FIG. 3 is a view of the system of FIG. 1 showing how horizontal (X co-ordinate) movement can occur, FIGS. 4a and 4b are plan and elevational views respectively, again of the system of FIG. 1, indicating how sideways (Y co-ordinate) movement can occur, and FIG. 5 is a diagrammatic part exploded perspective view of a manipulator employing a pantograph linkage system in accordance with the invention.

Throughout the drawings corresponding parts have been given the same reference numerals.

Referring to FIG. 1 a pantograph linkage comprises a pair of arms 1 and 2 pivotted at 3 and interconnected by links 4 and 5 which are pivotally secured to the arms at 6 and 7 respectively and to each other at 8. The links 4 and 5 form a parallelogram with the adjacent portions of the arms 1 and 2 and the relative lengths a and c of the links 4 and 5 respectively and d and b of the respective free portions of the arms 1 and 2 are such that $b/a = c/d = m$, m being the multiplication factor.

Input movements in all three dimensions applied to the free end 9 of the arm 1 or to the pivot point 8 (whilst holding a point not being moved against translational movement) will occasion parallel movement of the free end 10 of the arm 2, the magnitude of which is determined by the value of m. The ends 9 and 10 of the arms 1 and 2 will incidentally, throughout the range of movement permitted by the linkage system, remain on a straight line passing through the point 8.

With a basic pantograph linkage as so far described it will be apparent that the orientation of the arm 2 will change upon movement of the pantograph and hence the orientation of a tool, gripping device or the like, fixed to the free end 10 of the arm will likewise be changed. Such a change in orientation may, as is known, be avoided by providing further links 11 and 12 connected in parallel with the links 1 and 2 respectively to form two parallelogram linkages. The ends of these parallelogram linkages are held in a fixed relative orientation as for example by a bracket piece 13 on which the pivot point 3 of the arms 1 and 2 as well as the pivots 3' and 3" of the parallel links 11 and 12 are located. Conveniently as in the case illustrated the arrangement is such that the ends of the two parallelogram linkages are maintained at right angles to each other, but other relative orientations may be selected if desired.

As a consequence of the above described arrangement, throughout movements of the mechanism in directions which for convenience may be termed horizontal or vertical, or combinations of such movements, i.e. in the plane of the drawing, the end 10 of the arm 2 and the end 10' of the link 12 will remain in a fixed orientation.

The manner in which the pantographic linkage system may be moved is illustrated in FIGS. 2, 3 and 4. The convention is adopted that the Z axis corresponds to vertical movement of the system as shown in FIG. 2, the X axis corresponds to horizontal movement in the plane of the drawing as shown in FIG. 3 and the Y axis corresponds to sideways or yawing movement as shown in FIGS. 4a and 4b. In all the cases illustrated the pivots 9, 9' of the arm 1 and link 11 are held against translational movement whilst the mechanism is operated by an input applied to the point 8. As already mentioned, movement of the free end 10 of the arm 2 and the corresponding end 10' of the link 12 is in all cases parallel to the movement applied to the point 8 and as is also indicated the spatial orientation of the points 10 and 10' remains constant throughout the movements as is indicated by the alternative positions shown. Thus a tool, tool holder or the like appropriately secured between or in relation to the points 10 and 10' will be maintained in a constant orientation.

Although for the sale of clarity it has not in FIGS. 1-3 been shown, as can be seen from FIGS. 4a and 4b the pantograph linkage system in accordance with the invention in fact comprises two pantograph linkages arranged to operate in parallel and interconnected so that the pair of pantograph linkages constitute a parallelogram linkage such that when the Y co-ordinate of the mechanism is moved the orientation of the end 10" of the combined pantograph linkages is maintained in a constant orientation. It will be plain that by simple interpolation straightline movement can be generated between any two points in space.

The precise manner in which the linkage system is constructed and the manner in which the several parallelogram linkage systems contained within it are arranged to operate is largely a matter of choice as is the nature of the prime movers which may be employed to operate the system. One example, however, of a manipulator arm for effecting straightline motion of a tool holder along XYZ Cartesian co-ordinates by simple straightline input movements is illustrated in FIG. 5. In the arrangement illustrated the pantographic linkage systems are mounted on a base structure 20 which mounts a pair of frames 21 and 22. The lower ends of the links 5 are secured to swivels 23 carried by the frame 21 and the lower ends of the arms 1 and links 11 are correspondingly attached to swivelling brackets 24 carried by the frame 22. A tool holder 30 in the form of a gripping device is mounted at the free ends of the arm 2 and links 12.

Z co-ordinate movement is effected by an actuator in the form of a stepping motor 25 operating a screw thread mechanism acting on the frame 21. X co-ordinate movement is effected by a comparable actuator 26 by which the frame 22 may be slidden towards and away from the frame 21. Y co-ordinate movement is effected by an actuator 27 arranged to slide the assembly comprising the frame 22 and the actuator 26 bodily sideways in relation to the frame 21. As indicated at the outset, necessary input movements can be applied either to the point 8 or 9 and the manner in which this movement is occasioned is open to a wide degree of selection. It will be noted that whereas in FIG. 3 for example it has been assumed that the X co-ordinate movement was applied by moving the point 8, in the practical arrangement illustrated in FIG. 5 the corresponding movement is effected by movement of the point 9. Also although the total system requires that its various parts act as parallelograms this may be achieved other than necessarily by providing parallel links in all the positions illustrated in the diagrams. For example it will be noted that in the practical arrangement of FIG. 5 no horizontal link is provided between the inner ends of the arms 2 and links 12 of the parallel pantographs, the rigidity of the arrangement provided by the other interconnections and brackets illustrated being relied upon to maintain the inner ends of the aforementioned arms and links parallel to one another. This in fact avoids the need for elaborate joints such as might otherwise by necessary to permit the required degrees of movement.

Although normally the magnification between input and output movements provided by the linkage system will be fixed plainly provision could be made for adjusting the effective lengths of the arms and links to vary the magnification if desired.

I claim:

1. A manipulator comprising a pair of pantographs interconnected to serve as opposed links of a parallelogram linkage, the pantographs in turn having first and second arms each operative as a parallelogram linkage, means for maintaining interconnections of the parallelogram linkages in fixed relative relationships and means for imparting linear input movement in all three dimensions to the pantographs whereby three dimensional movement of a tool or the like suitably secured to the pantographs may be occasioned whilst maintaining its spatial orientation constant.

2. A manipulator comprising a pair of pantograph linkages, means interconnecting the pantograph linkages in parallel relationship such that the said pantograph linkages constitute opposed links of a parallelogram linkage, each pantograph linkage comprising a first and a second arm, each arm comprising a pair of links operatively interconnected to act as a parallelogram linkage and means for imparting to the pantograph linkages linear input movements in all three dimensions whereby movement of a tool holder suitably secured thereto may be occasioned while maintaining its spatial orientation constant.

3. A manipulator as claimed in claim 1 or 2 in which the means for imparting input movements comprise three stepping motors each operating a screw threaded mechanism to produce movements along mutually orthogonal axes.

4. A manipulator comprising a pair of pantograph linkages, means interconnecting the pantograph linkages in parallel relationship such that the said pantograph linkages constitute opposed links of a parallelogram linkage, each pantograph linkage comprising a first and a second arm, means pivotally interconnecting the arms, each arm comprising a pair of links operatively interconnected to act as a parallelogram linkage, the interconnection adjacent the pivotal interconnection of the arms comprising a bracket serving to maintain the interconnections of the parallel linkages constituting the first and second arms in a fixed relationship, means for mounting a tool holder between the second arms of the pantograph linkages, means for pivotally securing the first arms of the pantograph linkages to a base structure, three means for imparting linear movements to the pantograph linkages being provided in the base structure, the said movement imparting means being arranged to produce movements along mutually orthogonal axes whereby three dimensional movement of the tool holder may be occasioned whilst maintaining its spatial orientation constant.

* * * * *